United States Patent Office 3,003,972
Patented Oct. 10, 1961

3,003,972
METHOD OF CATALYST MANUFACTURE
Vladimir Haensel, Hinsdale, Ill., assignor, by mesne assignments, to Universal Oil Products Company, Des Plaines, Ill., a corporation of Delaware
No Drawing. Filed July 7, 1958, Ser. No. 746,657
6 Claims. (Cl. 252—441)

This invention relates to a method of catalyst manufacture, and more particularly, relates to a method for the manufacture of alumina-combined halogen catalysts, and still more particularly, relates to a method of manufacturing alumina-combined fluorine-platinum catalysts.

Catalysts comprising refractory oxides containing combined halogen and a platinum group metal, and various methods for the manufacture thereof, have been disclosed in the prior art. The manufacture of such catalysts, which has been suggested in the prior art, has in the main, been one involving basic impregnation. However, although basic impregnation is generally satisfactory for the preparation of such catalysts which have been in commercial use up to the present time, when it is desired to increase the combined halogen content of such catalysts for use for other or new reactions, this method of manufacture is not entirely satisfactory. The present invention is based upon the discovery that exceptionally high activity catalysts may be prepared by the specific methods of manufacture to be hereinafter described in detail.

One embodiment of the present invention relates to a method of preparing a catalyst which comprises impregnating a refractory oxide containing combined halogen with a homogeneous aqueous solution of a water-soluble compound of platinum group metal containing (1) a hydrogen halide and (2) another water-soluble acidic compound, said solution being characterized by a pH value below 2.5.

Another embodiment of the present invention relates to a method of preparing a catalyst which comprises impregnating an alumina-containing catalyst support containing combined halogen with a homogeneous aqueous solution of a water-soluble compound of a platinum group metal containing (1) hydrogen chloride and (2) another water-soluble acidic compound, said solution being characterized by a pH value below 2.5.

A further embodiment of the present invention relates to a method of preparing a catalyst which comprises impregnating an alumina-combined fluorine catalyst support with a homogeneous aqueous solution of a water-soluble compound of platinum, in an amount to form a final catalyst containing from about 0.01% to about 1% by weight of platinum, containing (1) hydrogen chloride and (2) another water-soluble acidic compound, said solution being characterized by a pH value below 2.5.

A specific embodiment of the present invention relates to a method of preparing a catalyst which comprises impregnating an alumina-combined fluorine catalyst support with a homogeneous aqueous solution of a water-soluble compound of platinum, in an amount to form a final catalyst containing from about 0.01% to about 1% by weight of platinum, containing (1) hydrogen chloride and (2) nitric acid, said solution being characterized by a pH value below 2.5, and said combined fluorine being present in an amount of from about 2.0 to about 5.0% by weight based on the alumina.

Another specific embodiment of the present invention relates to a method of preparing a catalyst which comprises impregnating an alumina-combined fluorine catalyst support with a homogeneous aqueous solution of a water-soluble compound of platinum, in an amount to form a final catalyst containing from about 0.01% to about 1% by weight of platinum, containing (1) hydrogen chloride and (2) sulfuric acid, said solution being characterized by a pH value below 2.5, and said combined fluorine being present in an amount of from about 2.0 to about 5.0% by weight based on the alumina.

It has been found that exceptionally high activity catalysts are prepared in accordance with the novel features of the present invention. While these catalysts may contain larger concentrations of a platinum group metal which may range up to about 10% by weight or more of the support, particularly alumina containing combined fluorine, it has been found that exceptionally high activity catalysts may be prepared to contain from as low as from about 0.01% to about 1% by weight of platinum. Catalysts of these low platinum concentrations are particularly preferred in the present invention because of the considerably lower cost of the catalyst, thus enhancing the attractiveness of the catalyst for use in commercial processes. However, in order to obtain high activity catalysts with these low platinum concentrations, it is necessary that the platinum be composited with a particular type of support. First of all, this support must contain combined halogen, particularly combined fluorine. Second, the support must be a refractory oxide, and more specifically, a refractory metal oxide. It has been found that alumina shows unexpected advantages for use as the support containing combined halogen for low platinum concentration catalysts, apparently due to some particular association of the platinum with the alumina, either as a chemical combination or as a physical association. Platinum on other supports containing combined halogen such as alumina-silica containing combined halogen, alumina-titania containing combined halogen, alumina-boria containing combined halogen, alumina-zirconia containing combined halogen, alumina-silica-magnesia containing combined halogen, etc., also shows catalytic activity and the method of my invention for specifically compositing platinum with alumina containing combined halogen may also be used for compositing platinum with these other alumina containing composites, but not necessarily with equivalent results.

As stated hereinabove, the method of manufacture herein disclosed is particularly applicable to compositing a platinum group metal with a catalyst support comprising a refractory oxide containing combined halogen. It has previously been shown that the presence of combined halogen within a specific range enhances the activity of catalysts for certain reactions. It has been stated that the halogen probably enters into some chemical combination or loose complex with the catalyst support, particularly alumina, or possibly with the platinum, and thereby results in increased activity of the final catalyst. While any of the halogens will serve to effect this high activity, fluorine is particularly preferred, and next in order is chlorine, while bromine and iodine are generally less preferred. Mixtures of the halogens may also be used. It is understood that while any of the halogens may serve to effect improved catalyst activity, they are not necessarily equivalent in doing so.

As hereinabove set forth, the catalysts of the present invention are prepared by a specific method or procedure. It is an essential feature of the present invention that the catalyst support containing combined halogen, particularly alumina containing combined fluorine, be commingled with an aqueous solution of a water-soluble compound of a platinum group metal containing (1) a hydrogen halide and (2) another water-soluble acidic compound, said total soltuion being characterized by a pH value below 2.5. The water-soluble compound of the platinum group metal, particularly platinum, is dissolved in, and is part of this solution in a quantity such that the final catalyst preferably will contain from about 0.01% to about 1% of this component. By the use of a water-soluble compound of platinum, a hydrogen halide, and another water-soluble acidic compound, a homogeneous aqueous solution is obtained which will readily penetrate and be uniformly distributed throughout the refractory oxide containing combined halogen, particularly alumina-combined fluorine, thereby resulting in an improved catalyst. Catalysts containing nonuniform distribution of a platinum group metal are not nearly as satisfactory as catalysts prepared in accordance with the present process due to a peculiar association of the platinum group metal and support which is obtained by the present process and which is required to produce high activity catalysts. Uniform distribution of the platinum group metal results in crystallites of the metal of very small sized distributed throughout the support. For example, it appears that a particular spacial arrangement of platinum in relation to an alumina-combined fluorine support is necessary in order to obtain high activity catalysts. This desired arrangement is not achieved when the platinum atoms are grouped too closely to each other, thus increasing platinum crystallite size. In any event, it appears that maximum catalyst activity is achieved by the use of a mixture of a hydrogen halide and another acid compound along with chloroplatinic acid, which solution is preferred for use in compositing platinum with alumina containing combined fluorine.

Up to the present time, it has been suggested that a basic compound be added to a platinum-containing solution prior to compositing the solution with a support. Specifically, ammonium hydroxide was added to a solution of chloroplatinic acid, and the theory set forth was that the ammonia associated itself with the chloroplatinic acid forming a complex which in turn homogeneously distributed itself throughout the alumina. I have now discovered that when this combined fluorine content is higher than about 1%, a more uniform impregnation is obtained by contact of the support with a homogoneous aqueous solution of a water-soluble compound of a platinum group metal containing (1) a hydrogen halide and (2) another water-soluble acidic compound. One explanation, although I do not intend the invention to be limited thereto, is that the presence of the acid tends to keep the water-soluble compound of the platinum group metal in a nonionized form and, therefore, the platinum group metal compound, instead of associating itself with the surface of the alumina particles, thoroughly impregnates the alumina particles to produce a final catalyst in which the platinum group metal is uniformly distributed throughout the alumina.

The alumina for use in preparing alumina-combined fluorine supports, may itself be prepared in any of many well known methods. One method is to prepare alumina by adding a suitable reagent, such as ammonium hydroxide, ammonium carbonate, etc., to a salt of aluminum such as aluminum chloride, aluminum nitrate, aluminum acetate, etc., in an amount to form aluminum hydroxide which, upon drying, is converted to alumina and in the interest of simplicity, the aluminum hydroxide is referred to as alumina in the present specification and claims in order that the percentages are based on the alumina free from combined water. It has been found that aluminum chloride is generally preferred as the aluminum salt in this method, not only for convenience in subsequent washing and filtering procedures, but also because it appears to give the best results.

After the alumina has been formed, it is generally washed to remove soluble impurities. Usual washing procedures comprise washing with water, either in combination with filtration or as separate steps. It has been found that filtration of the alumina is improved when the water washing includes a small amount of ammonium hydroxide. The severity of washing will depend upon the particular method employed in preparing the catalyst. In one embodiment of the invention, the alumina is thoroughly washed with a suitable amount of water, and preferably water containing ammonium hydroxide, to reduce the chlorine content of the alumina to below about 0.1%. In another embodiment of the invention, this washing may be selective to retain chlorine ions in an amount of from about 0.2 to about 8% by weight of alumina on a dry basis. In general, it is preferred to wash the alumina thoroughly, and if it is desired to add chlorine, it is added as a separate step because better control of the amount of chlorine is obtained in this manner.

In some cases, it is desirable to prepare the catalyst in the form of pills of uniform size and shape and this may readily be accomplished by grinding the partially dried alumina with a suitable lubricant such as stearic acid, rosin, graphite, etc., and then forming the pills in any suitable pelleting or extruding apparatus. The combined halogen, particularly combined fluorine, may be added before or after forming the alumina into particles of uniform size and shape. In still another embodiment, the combined halogen and the platinum addition may be effected prior to forming the composite into particles of uniform size and shape.

Alumina spheres may be continuously prepared by passing droplets of an alumina sol into an oil bath maintaining at elevated temperature and retaining the droplets in said oil bath until the sol droplets set to gelled spheres. The spheres are continuously withdrawn from the oil bath and immediately thereafter aged prior to being contacted with water or aqueous solutions. The spheres may then be dried and calcined at a temperature of about 500° to about 1400° F. or more.

Regardless of the stage of catalyst preparation at which the combined halogen is added, the combined halogen may be incorporated therein in any suitable manner. However, the halogen must be added in a form which will readily react with the alumina in order to obtain the desired results and also must not leave undesired deposits in the catalyst. A preferred method of adding the combined halogen is in the form of an acid such as hydrogen fluoride, hydrogen chloride, hydrogen bromide and/or hydrogen iodide. Hydrogen fluoride is preferably added as an aqueous solution for ease in handling and for better control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the combined halogen may be added as fluoride, chloride, bromide or iodine, but in view of the fact that the halogens normally are more difficult to handle, it is generally preferred to utilize them in the form of a solution for ease in handling. In some cases, the inclusion of certain components will not be harmful but may be beneficial and in these cases, the combined halogen may be added in the form of suitable salts. The concentration of combined halogen in the finished catalyst will be within the range of from about 0.1 to about 8% by weight of the support, particularly alumina, on a dry basis. Combined fluorine appears to be most active and, therefore, will be used within the range of from about 0.1% to about 5% by weight of the support on a dry basis, and more particularly, from about 2% to about 5% by weight of alumina on a dry basis. Combined chlorine concentration will usually be from about 0.2 to about 8% by weight of the support on a dry basis. It has been found that combined halogen concentrations below these lower limitations do not give the desired improvement and, on the other hand, concentrations of halogen above the upper limitations adversely affect the selectivity of the catalyst, thus catalyzing side reactions to an extent greater than desired.

The homogeneous aqueous solution of a water-soluble compound of a platinum group metal containing a hydrogen halide and another water-soluble acidic compound may be prepared in any suitable manner. Various water-soluble compounds of the platinum group metals comprising platinum, palladium, ruthenium, rhodium, osmium, and iridium may be used. Chloroplatinic acid is the preferred platinum compound to be used in accordance with the present invention because of its ready availability and low cost. Suitable water-soluble compounds of other platinum group metals include palladium chloride, palladium chloride dihydrate, palladium sulfate, ruthenium trichloride, ruthenium tetrachloride, rhodium trichloride tetrahydrate, rhodium sulfate dodecahydrate, rhodium sulfite hexahydrate, osmium chloride, osmium ammonium trichloride trihydrate, iridium tribromide, tetrahydrate, iridium tetrabromide, iridium tetrachloride, etc. It is understood that other water-soluble compounds of platinum group metals may be used in accordance with the present invention, however, not necessarily with equivalent results. As hereinbefore set forth, the amount of platinum group compound, particularly platinum compound is, preferably controlled so that the final catalyst contains from about 0.01% to about 1% of the platinum group metal, more particularly platinum.

As set forth hereinabove, the water-soluble compound of the platinum group metal is dissolved in a homogeneous aqueous solution containing a hydrogen halide and another water-soluble acidic compound. In another manner, the water-soluble compound of the platinum group metal is dissolved in water and the hydrogen halide and another water-soluble acidic compound added thereto, either one after the other, or together. The hydrodrogen halide may be selected from hydrogen fluoride, hydrogen chloride, hydrogen bromide and hydrogen iodide. Most concentrations of hydrogen fluoride will not be utilized since not only is hydrogen fluoride substantially reactive with the alumina, but also because the alumina contains combined halogen prior to this impregnation procedure and the fluorine tends to increase the quantity of combined halogen therein. This happens because the fluorine apparently forms very strong bonds with the alumina and thus is not readily removed during drying and calcination, to be described hereinafter. The other hydrogen halides do not suffer from this deficiency of forming strong bonds with the support. However, concentrated solutions of the other hydrogen halide should not be utilized since they tend to attack the support, particularly alumina, reducing its available surface area and producing fines which cause an overall process loss. Of the hydrogen halides which are utilized in accordance with the process of this invention, hydrogen chloride is preferred. The other water-soluble acidic compound utilized in admixture with the hydrogen halide may be selected from various inorganic and organic compounds including nitric acid, sulfuric acid, phosphoric acid, aluminum nitrate, formic acid, acetic acid, propionic acid, oxalic acid, and more generally include acids and acid salts which are more acidic than the chloroplatinic acid or the other water-soluble platinum group metal compound that is selected. Furthermore, mixtures of these last-mentioned other water-soluble acidic compounds can be used in admixture with a hydrogen halide and a water-soluble compound of a platinum group metal to form the homogeneous aqueous solution for impregnating the refractory oxide containing a combined halogen in accordance with the process of this invention. In any case, the composition of the acidic homogeneous aqueous solution must be controlled so that it is not substantially reactive with the refractory oxide, particularly alumina, containing combined halogen at any of the conditions in which it is in contact with the refractory oxide containing combined halogen during the preparation of the catalyst. In some cases, only certain concentrations of acidic compounds are substantially reactive with such refractory oxides, particularly alumina, and these concentrations should not be used. Acidic compounds and acidic solutions may be used, however, even when they are reactive with the alumina, if the resultant product or residue is not too harmful to the catalyst and/or if the resultant product or residue is removed in a further treatment, such as washing or calcination, and/or if the formation of the resultant product or residue does not harm the final catalyst. In most cases, both the hydrogen halide and other water-soluble acidic compounds are removed after impregnation by washing or by calcination. As an example of a water-soluble acidic compound which may be utilized and which is substantially reactive with alumina under certain conditions, sulfuric acid may be selected. Higher concentrations of sulfuric acid, especially at elevated temperatures, are reactive with the alumina and these higher concentrations and elevated temperatures are not to be used when employing sulfuric acid. Usually the impregnation is carried out at a concentration and a temperature such that the sulfuric acid is not reactive with the alumina and at these concentrations and temperatures, it may be satisfactorily utilized.

The amount of hydrogen halide and other water-soluble acidic compound will vary with the particular hydrogen halide and other acidic compound and with the particular water-soluble compound of a platinum group metal utilized. In general, only a small amount of hydrogen halide and other water-soluble acidic compound will be required, the combined amount of both generally being sufficient to characterize the pH of the solution containing the water-soluble platinum group metal as below 2.5, and particularly below 2.0. Generally, equal quantities by weight of hydrogen halide and the other water-soluble acidic compound are utilized satisfactorily. For example, a 1% solution of hydrochloric acid and a 1% solution of nitric acid serves as a satisfactory base for dissolving chloroplatinic acid and preparing a homogeneous aqueous solution for impregnating the hereinabove described support. The hydrogen halide concentration, particularly hydrogen chloride concentration, will generally be not greater than 2% when alumina-combined fluorine is the refractory oxide being impregnated. The weight percent of hydrogen halide utilized may be as low as 0.1% or less and satisfactory results still obtained. The amount of the other acidic compound that is to be added may be measured by the amount necessary to impart to the impregnating solution a specified pH. The preferred method is by measuring a stoichiometric amount of another acidic compound that is added to the hydrogen halide and platinum group metal solution and/or to the halogen-containing solution and/or to the platinum and halogen-containing solution. The concentration of the other acidic compound will be within the range of from about 0.001 to about 5.0 molar with respect to the other acidic compound and preferably from about 0.005 to about 3.0 molar. Concentrations below this wider range are often too weak to be effective and concentrations above this range often are too reactive with the alumina or alumina-combined halogen or other refractory oxide containing combined halogen.

The homogeneous aqueous solution of a water-soluble compound of a platinum group metal containing hydrogen halide and another water-soluble acidic compound may be composited with the refractory oxide containing combined halogen in any suitable manner. For example, when the solution is to be composited with alumina-combined halogen in a wet condition, this is readily accomplished by adding the solution to the alumina-combined halogen and thoroughly mixing the same to obtain uniform distribution, after which the composite is washed and the washed material is dried at a temperature of from about 200° F. to about 500° F. for a period of from 2 to about 24 hours or more. The addition of the hydrogen halide and other acidic compound may be followed by the addition of the water-soluble compound of a platinum group metal or they may be added simultaneously. When particles of irregular shape and size are desired, the dried material may be ground and then calcined to a temperature of from about 500° F. to about 1100° F. for a period of from about 2 to about 12 hours or more. In another manner, when particles of uniform size and shape are desired, a suitable lubricant such as stearic acid, rosin, hydrogenated coconut oil, graphite, etc. is added to the dried material and then it is formed into particles of uniform size and shape by any suitable method such as pelleting, extrusion, etc. These particles are then calcined at a temperature within the range as hereinabove set forth.

In a preferred embodiment of the invention, the alumina containing combined halogen, particularly alumina containing combined fluorine, prior to commingling with the other components, is formed into particles of definite size and shape. This is accomplished in substantially the same manner as hereinbefore set forth but before the platinum is composited with the alumina-combined fluorine, the alumina particles may be calcined at a somewhat higher temperature which may be within the range of from about 800° F. to about 1400° F. Commingling of the platinum compound-hydrogen halide-other acidic compound solution may be accomplished in any suitable manner including soaking the alumina pills in the solution and either draining off the excess solution or heating to remove materials which will volatilize. Another suitable method is by dipping the alumina particles in the solution. In any event, the alumina is contacted with the solution for a sufficient period of time to obtain uniform distribution of the solution throughout the alumina and impregnation of the alumina with the platinum compound, after which the composite may be dried at a temperature of from about 200° F. to about 500° F. for a period of from about 2 to about 24 hours or more and then calcined at a temperature of from about 500° F. to about 1100° F. for a period of from about 2 to about 12 hours or more. The calcination is preferably effected in the presence of air or other oxygen-containing gas. In another embodiment of the invention, the calcination may comprise a two-stage method in which it is first calcined in the presence of hydrogen and then followed by calcination in air or the reverse procedure may be employed.

The improved catalyst of the present invention may be employed in any process for which platinum is a catalyst. The improved catalyst is particularly effective for hydroisomerization operations. The term "hydroisomerization" is well known in the petroleum industry and refers to the treatment of saturated hydrocarbons to improve their antiknock characteristics or to the treatment of straight-chain paraffins or less highly branched paraffins to prepare intermediates for use as feed stocks or reactants in other petroleum refining processes. The saturated hydrocarbons which are utilized in hydroisomerization processes contain at least four carbon atoms per molecule and may be utilized as substantially pure hydrocarbons or as mixtures thereof. For example, n-butane is a satisfactory feed stock and as such, may be fractionated from naturally occurring petroleum hydrocarbons or it may be prepared as an intermediate fraction from various petroleum refining operations. In a like manner, n-pentane or n-hexane or mixtures thereof may be utilized. The molecular weight of the saturated hydrocarbons used in hydroisomerization may vary from four carbon atom fractions as set forth hereinabove up to about ten carbon atom fractions or more. The catalyst of the present invention may also be utilized for the hydroisomerization of mixtures of paraffins and naphthenes.

In the hydroisomerization process, the main reaction which takes place is the conversion of less highly branched chain paraffins to more highly branched chain paraffins. n-Butane is converted to isobutane, n-pentane is converted to isopentane; and n-hexane is converted to a mixture of hexane isomers including 2-methylpentane, 3-methylpentane, 2,2-dimethylbutane and 2,3-dimethylbutane. A very slight amount of hydrocracking takes place during hydroisomerization. As a result of this hydrocracking, some hydrogen consumption is observed in hydroisomerization process, usually in a quantity less than about 100 cubic feet per barrel of feed. Due to the presence of hydrogen during the hydroisomerization reaction, unsaturated hydrocarbons or hydrocarbon fragments formed as a result of cracking, are saturated and coke laydown on the catalyst is thereby minimized. This results in long catalyst life and a process which is commercially attractive from an economic viewpoint. Thus, one of the objects of the present invention is to provide a catalyst wherein hydrocracking activity is controlled and selective so that excessive amounts of normally gaseous products are not produced. Uncontrolled or nonselective cracking which occurs in the presence of many prior art isomerization catalysts results in more rapid formation of larger quantities of coke or other high boiling hydrocarbonaceous material which deposits on the catalyst or complexes therewith, decreasing or destroying its activity to catalyze the desired reaction. This, in turn, results in shorter process cycles or periods with the necessity of more frequent regeneration of the catalyst by burning the carbonaceous products therefrom, or should the catalyst activity be destroyed, it is necessary to shut down a processing unit to remove the old catalyst and replace it.

While the catalyst of the present invention is particularly suitable for the hydroisomerization of saturated hydrocarbons, it is understood that this novel catalyst may be utilized for the conversion of other hydrocarbon fractions. For example, the catalyst may be employed for reforming operations which are well known in the petroleum industry for upgrading full boiling range gasolines or naphthenes. The catalyst of the present invention may also be applied to the reforming of cracked gasoline or mixtures of cracked and straight run and/or natural gasoline. In addition, the catalyst may be used for the dehydrogenation of selected hydrocarbon fractions, although obviously not necessary under the same conditions of operation, said hydrocarbon fractions including naphthenes thus producing aromatics, including specifically the dehydrogenation of cyclohexane to benzene, methylcyclohexane to toluene, ethylcyclohexane to ethylbenzene, etc., the dehydrogenation of paraffins to produce the corresponding olefins, including specifically dehydrogenation of butane to butene, pentane to pentene, hexane to hexene, etc. and the dehydrogenation of monoolefins to produce the corresponding diolefins including specifically dehydrogenation of butene to butadiene and the dehydrogenation of 2-methylbutene to isoprene. The catalyst may also be utilized to effect dehydrocyclization reactions including specifically the conversion of n-hexane to benzene, n-heptane to toluene, etc. Furthermore, the catalyst may be used for effecting hydrogenation reactions including nondestructive hydrogenation, as for example, the hydrogenation of olefins to paraffins, diolefins to olefins, aromatics to cycloparaffins, etc., and the destructive hydrogenation of heavier oil to gases and/or gasoline fractions. In still another embodiment, the catalyst of the present invention may be used for effecting oxidation of hydrocarbons to form the corresponding oxides, such as the oxidation of n-butane to n-butyl alcohol. The catalysts are also effective for desulfurizing sulfur-containing hydrocarbon fractions. The desulfurization may be effected in the presence or absence of hydrogen. In the desulfurization reaction, the organic sulfur compounds such as mercaptans or thiophenes are converted to hydrogen sulfide which may be stripped out in subsequent operations.

As hereinabove set forth, the catalyst of the present invention is particularly suitable for use in the hydroisomerization of saturated hydrocarbons or fractions containing saturated hydrocarbons. The exact operating conditions depend on the character of the charge stock as well as the activity of the catalyst being used. However, the conditions usually will be in the following ranges: temperatures of from about 475° F. to about 900° F., pressures of from about 100 to about 1500 pounds per square inch or more, hourly liquid space velocities which are defined as the volume of hydrocarbon reactants, measured as liquid, per hour per volume of catalyst of from about 0.5 to about 20 or more. The hydroisomerization process is effected in the presence of hydrogen which may be introduced from an extraneous source and recycled within the process. Sufficient hydrogen may be passed to the process to make up for that consumed. The hydrogen present in the reaction zone will be within the range of from about 0.5 to about 10 mols of hydrogen per mol of hydrocarbon. It is within the scope of the present invention to treat the hydrogen-containing gas, either as feed to the process or recycled therein, to remove hydrogen sulfide or other impurities before recycling.

Other selected operating conditions are required, depending upon the particular reaction desired. For example, for reforming of gasoline boiling range hydrocarbons, the temperature will range from about 600° F. to about 1100° F., the pressure from about 50 to about 1000 pounds per square inch or more, the hourly liquid space velocity from about 0.5 to about 20 or more, and the hydrogen to hydrocarbon ratio from about 0.5 to about 20 mols of hydrogen per mol of hydrocarbon. For the dehydrogenation of n-butane, for example, the temperature should be within the range of from about 800° F. to about 1100° F., the pressure from about atmospheric to about 50 pounds per square inch, and the gas hourly liquid space velocity from about 200 to about 5,000. For hydrogenation reactions, the temperature may range from ambient temperatures up to about 500° F., the pressure from about 100 to about 3,000 pounds per square inch or more, and the hourly liquid space velocity from about 0.5 to about 5.

Processes using the catalyst of the present invention may be effected in any suitable equipment. The finished catalyst may be deposited as a fixed bed in a reactor and the hydrocarbons being processed passed therethrough in either upward or downward flow. The catalyst may be used in a fluidized type of operation in which the catalyst and hydrocarbons are maintained in a state of turbulence under hindered settling conditions, or a fluidized fixed bed type of operation may be used in which the catalyst and hydrocarbons are maintained in a state of turbulence under hindered settling conditions but where catalyst is not withdrawn from or introduced into the reaction zone during the processing cycle. The catalyst may also be used in the moving bed type of process in which the catalyst and hydrocarbons are passed either in concurrent or countercurrent flow through a reaction zone, and the catalyst may also be used in the suspensoid type of operation in which the catalyst and hydrocarbons are passed as a slurry through the reaction zone. The reactants from any of the hereinbefore mentioned reaction zones are normally subjected to further treatment, such as stabilization of the product to separate normally gaseous paraffins therefrom to obtain a final hydroisomerized product of the desired boiling range.

The following examples are given to further illustrate the novelty and utility of the present invention, but are not given for the purpose of unduly limiting the generally broad scope of the present invention.

EXAMPLE I

This example describes the preparation of a catalyst which is utilized hereinafter in Example II for the hydroisomerization of n-pentane. The platinum-combined fluorine-alumina composite was prepared by the general method of dissolving aluminum pellets in hydrochloric acid to form a sol containing about 15% aluminum. At this point, sufficient hydrofluoric acid was added to the sol so that the final composite contained 3.9% fluorine based on the weight of the dry alumina. The resulting sol was mixed with hexamethylenetetramine in a continuous mixer and dropped into an oil bath maintained at about 90° C. to form spheres. The spheres were aged in the oil, and then in an aqueous solution of ammonia. The ammonium hydroxide washed spheres were then transferred to a dryer, dried at about 250° C. and calcined at about 650° C.

The synthetically prepared alumina-combined fluorine spheres were impregnated with a dilute solution of chloroplatinic acid containing 1% HCl and 1% nitric acid. The amount of platinum in the solution was adjusted so that the final composite contained about 0.375% platinum by weight based on the dry alumina. The pH of this solution was below 1.5. The thus impregnated composite was then dried at 110° C. and calcined in air at a temperature of about 500° C.

EXAMPLE II

This example illustrates the hydroisomerization of n-pentane to isopentane in the presence of the catalyst prepared in Example I. A 50 cc. quantity of the above prepared composite was placed as a fixed bed in a reaction zone and tested for activity for hydroisomerization. Conditions utilized included a pressure of 500 pounds per square inch, a hydrogen to hydrocarbon molar ratio of 2:1, and various liquid hourly space velocities and various temperatures. The results obtained are presented in the following Table I:

*Table I*

ISOMERIZATION WITH CATALYST OF EXAMPLE I

| Period No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Charge | (1) | (1) | (1) | (1) | (1) | (1) | (1) | (1) | (1) | (1) | (1) | (1) | (1) | (1) | (1) |
| Catalyst, cc | 50 | 50 | 50 | 50 | 50 | 50 | 50 | 50 | 50 | 50 | 50 | 50 | 50 | 50 | 50 |
| On stream, hrs | 7-10 | 15-18 | 23-26 | 31-34 | 39-42 | 47-52 | 60-63 | 75-80 | 85-88 | 98-103 | 113-118 | 121-123 | 126-128 | 131-133 | 142-145 |
| Conditions: | | | | | | | | | | | | | | | |
| Pressure, p.s.i.g | 505 | 500 | 500 | 500 | 500 | 500 | 500 | 500 | 500 | 500 | 500 | 500 | 500 | 500 | 505 |
| Temperature, ° C. block | 301 | 322 | 340 | 359 | 380 | 400 | 360 | 360 | 370 | 340 | 370 | 370 | 390 | 410 | 361 |
| LHSV | 3.88 | 3.98 | 3.97 | 3.88 | 3.97 | 3.98 | 4.00 | 2.02 | 3.94 | 2.06 | 1.98 | 7.60 | 7.78 | 7.88 | 3.94 |
| Ratio, hydrogen:hydrocarbon | 2:1 | 2:1 | 2:1 | 2:1 | 2:1 | 2:1 | 2:1 | 2:1 | 2:1 | 2:1 | 2:1 | 2:1 | 2:1 | 2:1 | 2:1 |
| Product Distribution, weight percent: | | | | | | | | | | | | | | | |
| $C_1$-$C_4$ | | 0.4 | | 0.6 | | 4.0 | | | | | 1.3 | 0.5 | 1.3 | 3.1 | |
| $C_5$+ | | 99.6 | | 99.4 | | 96.0 | | | | | 98.7 | 99.5 | 98.7 | 96.9 | |
| Analysis of $C_5$+: | | | | | | | | | | | | | | | |
| Isopentane | 6.7 | 9.3 | 17.4 | 39.7 | 61.8 | 60.8 | 41.9 | 52.6 | 51.5 | 23.1 | 56.3 | 37.5 | 57.9 | 60.3 | 41.2 |
| n-Pentane | 93.3 | 90.7 | 82.6 | 60.3 | 38.2 | 39.2 | 58.1 | 47.4 | 48.5 | 76.9 | 43.7 | 62.5 | 42.1 | 39.7 | 58.8 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Debutanizer ovhd., SOF/bbl | 31 | 24 | 30 | 41 | 57 | 112 | 45 | 23 | 46 | 33 | 54 | 48 | 66 | 103 | 35 |

[1] n-Pentane.

It should be noted from these results that extremely satisfactory conversion of n-pentane to iso-pentane is obtained with the catalyst prepared in accordance with the process of this invention. The temperature requirements to obtain equilibrium conversions are markedly reduced from temperature requirements disclosed in the prior art. At the end of 145 hours on stream, the catalyst contained 0.05% carbon by analysis. This time on stream is equivalent to a life of about 4 barrels of hydrocarbon charge per pound of catalyst and there was no indication during the experiment that the catalyst had deactivated in any degree. It is also interesting to note that the catalyst prepared in accordance with the process of this invention can be used at space velocities of 4 and 8 while maintaining equilibrium conversions. This is impossible with prior art catalysts such as alumnum chloride, with which space velocities of about 0.1–0.2 are necessary. This means, of course, that less catalyst is necessary in the reaction zone and thus, the economics of the process are much more favorable.

EXAMPLE III

This example illustrates a stability or so-called "life" test of the catalyst of Example I. Conditions utilized including a pressure of 500 pounds per square inch, a liquid hourly space velocity of 32, a hydrogen to hydrocarbon mol ratio of 2:1, and temperatures ranging from 445° C. to 460° C. The results obtained are presented in the following Table II.

*Table II*
LIFE TEST OF CATALYST FOR ISOMERIZATION OF n-PENTANE

Conditions

| | |
|---|---|
| Pressure, p.s.i.g | 500 |
| LHSV | 32 |
| Hydrogen to hydrocarbon, mol ratio | 2:1 |
| Temperature, °C | 445–460 |

| Period No. | Hrs. on stream | Weight percent iso-$C_5$ in total $C_5$ | Debut. ovhd. gas, s.c.f./bbl. |
|---|---|---|---|
| 16 | 70–75 | 53.9 | 53 |
| 17 | 89–94 | 56.8 | 98 |
| 18 | 99–103 | 55.8 | 85 |
| 19 | 143–148 | 56.9 | 75 |
| 20 | 193–198 | 55.9 | 75 |
| 21 | 238–243 | 56.7 | 70 |
| 22 | 283–288 | 57.0 | 74 |
| 23 | 419–424 | 54.8 | 80 |
| 24 | 464–469 | 55.7 | 82 |
| 25 | 524–529 | 56.6 | 87 |
| 26 | 554–559 | 54.5 | 88 |

Used catalyst, carbon: Weight percent
  Top section _____ 0.99
  Bottom section _____ 1.07

From the data in the above table, it is seen that the catalyst had a steady or stable activity with time over an on-stream period up to 560 hours. Conversion of n-pentane to isopentane was maintained at about 55 to about 56% isopentane in the total $C_5$ product. The debutanizer overhead gas from the vent scale pilot plant was fairly steady at a value of about 75 to 90 standard cubic feet per barrel, of which quantities a substantial proportion (about 30 cubic feet per barrel) was hydrogen. This total quantity is important since it shows that cracking did not increase with time as the catalyst aged. At the bottom of Table II are the figures for the carbon content of the used catalyst from this test. These figures show that the catalyst contained about 1% carbon at the end of this run. Although the catalyst was of substantially the same activity as it had been initially, this test was stopped since the catalyst demonstrated a useful life of over 100 barrels per pound.

EXAMPLE IV

This example illustrates the results obtained utilizing the catalyst of Example I for the simultaneous hydroisomerization of n-pentane and n-hexane. These experiments were carried out at 500 pounds per square inch, an hourly liquid space velocity of 3, a hydrogen to hydrocarbon mol ratio of 2:1 to 3:1, and at temperatures of 330° C., 350° C. and 370° C. As will be seen from the following Table III, three separate series of experiments were carried out using n-pentane diluted with 71%, 52% and 27% of n-hexane respectively. Each of these three different feed stocks was processed at the three different temperature levels. The results obtained are presented in the following Table III:

*Table III*
SIMULTANEOUS ISOMERIZATION OF n-PENTANE AND n-HEXANE WITH CATALYST OF EXAMPLE I

| Period No. | 27 | 28 | 29 | 30 | 31 | 32 | 33 | 34 | 35 |
|---|---|---|---|---|---|---|---|---|---|
| Catalyst, cc | 75 | 75 | 75 | 75 | 75 | 75 | 75 | 75 | 75 |
| On Stream, hrs | 7–10 | 15–18 | 23–26 | 33–36 | 41–44 | 49–52 | 59–62 | 67–70 | 75–78 |
| Conditions: | | | | | | | | | |
| P.s.i.g | 500 | 500 | 500 | 500 | 500 | 500 | 500 | 500 | 500 |
| Block T, °C | 330 | 350 | 370 | 330 | 350 | 370 | 330 | 350 | 370 |
| LHSV | 2.97 | 2.97 | 2.93 | 2.96 | 2.97 | 2.95 | 2.92 | 2.92 | 2.92 |
| $H_2$/HC, ratio | 2.66 | 2.20 | 1.72 | 2.07 | 3.03 | 3.22 | 3.36 | 3.79 | |
| Rates: Charge, cc./hr. at 60° F | 223 | 223 | 220 | 222 | 223 | 221 | 219 | 219 | 219 |
| Feed comp., weight percent: | | | | | | | | | |
| n-$C_4$ | | | | | | | 0.1 | 0.1 | 0.1 |
| n-$C_5$ | 26.6 | 26.6 | 26.6 | 45.9 | 45.9 | 45.9 | 71.7 | 71.7 | 71.7 |
| n-$C_6$ | 70.9 | 70.9 | 70.9 | 52.2 | 52.2 | 52.2 | 27.2 | 27.2 | 27.2 |
| MCP | 2.5 | 2.5 | 2.5 | 1.9 | 1.9 | 1.9 | 1.0 | 1.0 | 1.0 |
| Recovery, weight percent | 102.5 | 102.5 | 101.3 | 97.4 | 99.0 | 101.1 | 99.6 | 100.7 | 97.0 |
| Product analysis, weight, percent: | | | | | | | | | |
| $C_1$ | 1.6 | 2.0 | 2.6 | 1.2 | 0.9 | 0.8 | 0.4 | 0.3 | 0.2 |
| $C_2$ | 1.3 | 1.9 | 2.3 | 0.5 | 0.6 | 0.6 | 0.1 | 0.2 | 0.4 |
| $C_3$ | 3.5 | 7.3 | 13.0 | 1.3 | 1.9 | 4.3 | 0.2 | 0.8 | 1.8 |
| i-$C_4$ | 0.6 | 1.6 | 1.8 | 0.2 | 0.4 | 0.3 | 0.1 | 0.1 | 0.2 |
| n-$C_4$ | 2.1 | 3.7 | 3.1 | 0.9 | 1.3 | 1.0 | 0.3 | 0.4 | 1.0 |
| i-$C_5$ | 15.0 | 20.0 | 19.2 | 14.6 | 24.7 | 29.1 | 11.4 | 25.0 | 39.3 |
| n-$C_5$ | 15.5 | 12.7 | 12.2 | 32.6 | 23.8 | 18.3 | 56.7 | 42.4 | 28.2 |
| 2,2-$Me_2C_4$ | 6.5 | 7.0 | 6.0 | 2.8 | 5.4 | 5.8 | 1.4 | 2.5 | 3.6 |
| 2,3-$Me_2C_4$, 2-$MeC_5$ | 23.5 | 20.2 | 18.2 | 14.9 | 18.0 | 17.7 | 6.6 | 10.3 | 11.2 |
| 3-$MeC_5$ | 13.5 | 11.8 | 10.5 | 8.9 | 10.3 | 10.6 | 2.2 | 6.1 | 6.6 |
| n-$C_6$ | 16.5 | 11.6 | 10.7 | 21.1 | 12.3 | 10.8 | 19.7 | 10.7 | 6.9 |
| MCP | 0.4 | 0.2 | 0.4 | 0.7 | 0.4 | 0.7 | 0.9 | 0.9 | 0.6 |
| CH | | | | 0.3 | | | 0.3 | | |
| Total | 100.0 | 100.0 | 100.0 | 100.0 | 100.0 | 100.0 | 100.0 | 100.0 | 100.0 |

Several conclusions can be drawn from the above results. First of all, simultaneous hydroisomerization takes place. Equilibrium quantities of isopentane and isohexanes are obtained. Next, the amount of cracking observed varies with the composition of the feed stock. The higher amounts of cracking are associated with the highest hexane contents, cracking being minimized at the maximum n-pentane content in the feed. Last, a synergistic effect is apparent in this simultaneous processing. Thus, n-pentane can be isomerized in the presence of n-hexane to equilibrium values at conditions much less severe than with processing n-pentane alone. This latter observation results in an added advantage to catalysts prepared in accordance with the process of this invention. This added advantage is obtained when processing n-pentane and n-hexane simultaneously in the reactor in the presence of the catalyst prepared in this manner.

I claim as my invention:

1. A method of preparing a catalyst which comprises impregnating alumina containing in excess of 1% by weight of combined fluorine with a homogeneous aqueous solution of a water-soluble platinum compound, a hydrogen halide and an acidic compound selected from the group consisting of nitric acid, sulfuric acid, phosphoric acid, aluminum nitrate, acetic acid, oxalic acid, formic acid, and propionic acid, said solution having a pH value below 2.5.

2. The method of claim 1 further characterized in that said platinum compound is chloroplatinic acid.

3. The method of claim 1 further characterized in that said hydrogen halide is hydrogen chloride.

4. The method of claim 1 further characterized in that said acidic compound is nitric acid.

5. A method of preparing a catalyst which comprises impregnating alumina containing in excess of 1% by weight of combined fluorine with a homogeneous aqueous solution of chloroplatinic acid, hydrogen chloride and nitric acid, said solution having a pH value below 2.5.

6. A method of preparing a catalyst which comprises impregnating alumina containing in excess of 1% by weight of combined fluorine with a homogeneous aqueous solution of about 1% hydrogen chloride, about 1% nitric acid and sufficient chloroplatinic acid to form a final catalyst containing from about 0.01% to about 1% by weight of platinum, said solution having a pH value below 2.5.

References Cited in the file of this patent

UNITED STATES PATENTS

| | | |
|---|---|---|
| 2,582,428 | Haensel | Jan. 15, 1952 |
| 2,658,028 | Haensel | Nov. 3, 1953 |
| 2,746,937 | Hunter | May 22, 1956 |
| 2,840,532 | Haensel | June 24, 1958 |